(12) United States Patent
Fonte et al.

(10) Patent No.: US 10,151,565 B2
(45) Date of Patent: *Dec. 11, 2018

(54) BODY ARMOR UTILIZING SUPERELASTIC SPACER FABRIC, SUPERELASTIC 3D KNITS AND WEAVES AND/OR OTHER SUPERELASTIC 3D CONSTRUCTS SO AS TO REDUCE BEHIND ARMOR BLUNT TRAUMA (BABT)

(71) Applicant: Arthrex, Inc., Naples, FL (US)

(72) Inventors: Matthew Fonte, Concord, MA (US); Robert Devaney, Billerica, MA (US); Matthew Palmer, Cambridge, MA (US)

(73) Assignee: Arthrex, Inc., Naples, FL (US)

( * ) Notice: Subject to any disclaimer, the term of this patent is extended or adjusted under 35 U.S.C. 154(b) by 803 days.

This patent is subject to a terminal disclaimer.

(21) Appl. No.: 14/153,408

(22) Filed: Jan. 13, 2014

(65) Prior Publication Data

US 2014/0304877 A1    Oct. 16, 2014

Related U.S. Application Data

(63) Continuation-in-part of application No. 13/942,287, filed on Jul. 15, 2013, which is a continuation-in-part
(Continued)

(51) Int. Cl.
*F41H 1/02* (2006.01)
*A41D 31/00* (2006.01)
(Continued)

(52) U.S. Cl.
CPC ............. *F41H 1/02* (2013.01); *A41D 31/005* (2013.01); *A43B 1/04* (2013.01); *A43B 7/32* (2013.01); *A43B 17/00* (2013.01); *A63B 71/08* (2013.01); *A63B 71/12* (2013.01); *B32B 9/005* (2013.01); *B32B 9/047* (2013.01); *B32B 27/12* (2013.01); *A41D 13/05* (2013.01); *A63B 2071/1208* (2013.01); *A63B 2102/14* (2015.10);
(Continued)

(58) Field of Classification Search
CPC ........ Y10T 442/2615; Y10T 442/2623; D03D 1/0052; D10B 2501/04; D10B 2507/00
USPC ..... 442/134, 135; 89/36.01–36.17, 901–939; 428/911; 2/455–24
See application file for complete search history.

(56) References Cited

U.S. PATENT DOCUMENTS 6,103,641 A * 8/2000 Gehring, Jr. .............. B32B 5/26
428/911
6,530,564 B1 * 3/2003 Julien .................. A43B 13/186
267/147
(Continued)

OTHER PUBLICATIONS

Liu, Y., Compression Behavior of Warp-Knitted Spacer Fabrics for Cushioning Applications Textile Research Journal Aug. 2, 2011 doi:10.1177/0040517511416283.*
(Continued)

*Primary Examiner* — Andrew T Piziali
(74) *Attorney, Agent, or Firm* — Carlson, Gaskey & Olds, P.C.

(57) ABSTRACT

Body armor comprising a projectile-resistant outer layer and an energy-absorbing inner layer, wherein the energy-absorbing inner layer comprises a superelastic three dimensional construct.

23 Claims, 20 Drawing Sheets

Related U.S. Application Data of application No. 13/843,656, filed on Mar. 15, 2013, now Pat. No. 9,155,819, which is a continuation-in-part of application No. 13/764,188, filed on Feb. 11, 2013, now Pat. No. 9,278,000, said application No. 13/942,287 is a continuation-in-part of application No. 13/936,866, filed on Jul. 8, 2013, which is a continuation-in-part of application No. 13/843,656, and a continuation-in-part of application No. 13/764,188.

(60) Provisional application No. 61/596,900, filed on Feb. 9, 2012, provisional application No. 61/612,496, filed on Mar. 19, 2012, provisional application No. 61/661,086, filed on Jun. 18, 2012, provisional application No. 61/738,574, filed on Dec. 18, 2012, provisional application No. 61/668,732, filed on Jul. 6, 2012, provisional application No. 61/671,129, filed on Jul. 13, 2012, provisional application No. 61/752,008, filed on Jan. 14, 2013, provisional application No. 61/756,675, filed on Jan. 25, 2013, provisional application No. 61/823,285, filed on May 14, 2013, provisional application No. 61/903,803, filed on Nov. 13, 2013.

(51) Int. Cl.

| | | |
|---|---|---|
| *A63B 71/08* | (2006.01) | |
| *A63B 71/12* | (2006.01) | |
| *A43B 1/04* | (2006.01) | |
| *A43B 7/32* | (2006.01) | |
| *A43B 17/00* | (2006.01) | |
| *B32B 9/00* | (2006.01) | |
| *B32B 9/04* | (2006.01) | |
| *B32B 27/12* | (2006.01) | |
| *A41D 13/05* | (2006.01) | |
| *A63B 102/24* | (2015.01) | |
| *A63B 102/14* | (2015.01) | |

(52) U.S. Cl.
CPC ....... *A63B 2102/24* (2015.10); *A63B 2209/14* (2013.01); *A63B 2243/007* (2013.01); *B32B 2262/0253* (2013.01); *B32B 2262/0261* (2013.01); *B32B 2262/0269* (2013.01); *B32B 2262/106* (2013.01); *B32B 2307/51* (2013.01); *B32B 2307/56* (2013.01); *B32B 2307/718* (2013.01); *B32B 2307/724* (2013.01); *B32B 2571/02* (2013.01)

(56) References Cited

U.S. PATENT DOCUMENTS

| | | |
|---|---|---|
| 7,875,070 B2 | 1/2011 | Molaei |
| 7,976,648 B1 | 7/2011 | Boylan et al. |
| 8,216,398 B2 | 7/2012 | Bledsoe et al. |
| 8,418,269 B1 * | 4/2013 | McBride ................ A42B 3/285 2/410 |
| 8,425,588 B2 | 4/2013 | Molaei |
| 8,721,646 B2 | 5/2014 | Fox |
| 9,017,331 B2 | 4/2015 | Fox |
| 9,339,268 B2 | 5/2016 | Fox |
| 2005/0067816 A1 * | 3/2005 | Buckman ............. A41D 13/018 280/730.1 |
| 2011/0229685 A1 * | 9/2011 | Lin ........................ B32B 3/12 428/117 |
| 2014/0257420 A1 | 9/2014 | Fox |
| 2014/0324048 A1 | 10/2014 | Fox |

OTHER PUBLICATIONS

Bajaj, Pushpa. "Ballistic protective clothing: An overview." Indian Journal of Fibre and Textile Research, vol. 22, Dec. 1997, pp. 274-291.*

Boussu, F. "Development of Shape Memory Alloy Fabrics for Composite Structure" in "Intelligent Textiles and Clothing" Textile Institute 2006 Mattila, ed., pp. 124, 136-142.*

* cited by examiner

Nitinol Spacer Fabric can be knit into various thicknesses

Nitinol Spacer Fabric can be knit into various height (0.750" tall)

Stitch Density (North to South): 10 stitches per inch. These stitches are also referred to as "Courses."

Stitch Density (East to West): 10 stitches per inch. These stitches are also referred to as "Wales."

Nitinol Wire (300X): Using 0.005" diameter wire, Nitinol spacer fabric can have various filler density; 25% to 99% porous.

FIBER ENERGY ABSORPTION MECHANISMS

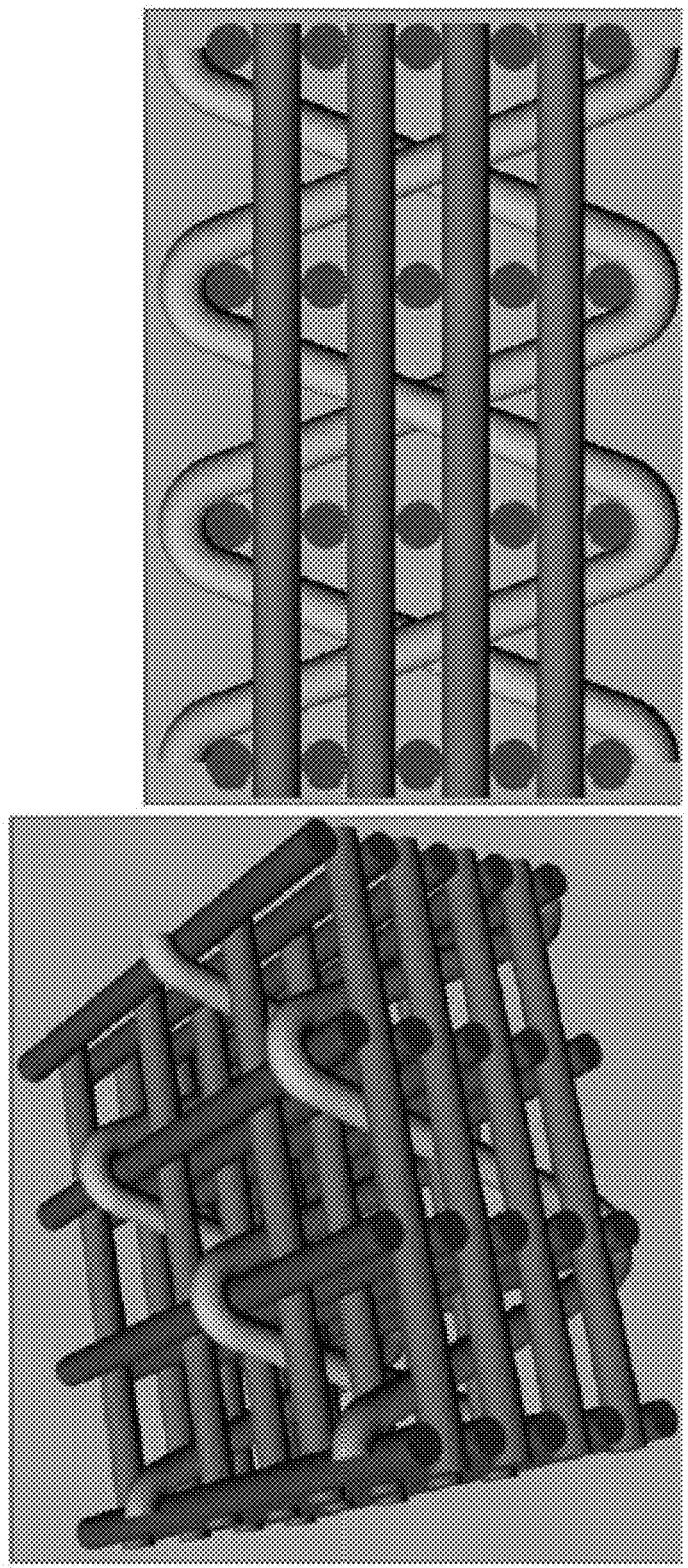
FIG. 16 Schematic of thick, integral 3D woven structure

3D WOVEN STRUCTURE

3D WOVEN STRUCTURE

3D Weaving machine
top shows overall view of the 3D weaving machine and bottom shows the machine during multi-insertion of filling yarns (x-yarns) through multi-shed formed of y-direction yarns (y-yarns) and z-yarns (top and bottom sheets)

Illustration of an orthogonal warp interlock (6 layers, 6 warp yarns)

BODY ARMOR UTILIZING SUPERELASTIC SPACER FABRIC, SUPERELASTIC 3D KNITS AND WEAVES AND/OR OTHER SUPERELASTIC 3D CONSTRUCTS SO AS TO REDUCE BEHIND ARMOR BLUNT TRAUMA (BABT)

REFERENCE TO PENDING PRIOR PATENT APPLICATIONS

This patent application:

(i) is a continuation-in-part of pending prior U.S. patent application Ser. No. 13/942,287, filed Jul. 15, 2013 by Matthew Fonte et al. for PROTECTIVE PADDING UTILIZING SUPERELASTIC THREE-DIMENSIONAL SPACER FABRIC COMPRISING SHAPE MEMORY MATERIALS (SMM), which patent application is, in turn, (1) a continuation-in-part of prior U.S. patent application Ser. No. 13/843,656, filed Mar. 15, 2013 by Matthew Fonte et al. for DYNAMIC POROUS COATING FOR ORTHOPEDIC IMPLANT, which patent application (a) is a continuation-in-part of prior U.S. patent application Ser. No. 13/764,188, filed Feb. 11, 2013 by Matthew Fonte et al. for POROUS COATING FOR ORTHOPEDIC IMPLANT UTILIZING POROUS, SHAPE MEMORY MATERIALS, which patent application claims benefit of prior U.S. Provisional Patent Application Ser. No. 61/596,900, filed Feb. 9, 2012 by Matthew Fonte et al. for POROUS, SHAPE MEMORY MATERIAL, ORTHOPEDIC IMPLANT COATING; (b) claims benefit of prior U.S. Provisional Patent Application Ser. No. 61/612,496, filed Mar. 19, 2012 by Matthew Fonte et al. for POROUS, SHAPE MEMORY MATERIAL, ORTHOPEDIC IMPLANT COATING; (c) claims benefit of prior U.S. Provisional Patent Application Ser. No. 61/661,086, filed Jun. 18, 2012 by Matthew Fonte et al. for "DYNAMIC" ORTHOPEDIC COATINGS MADE OF SPACER FABRIC; and (d) claims benefit of prior U.S. Provisional Patent Application Ser. No. 61/738,574, filed Dec. 18, 2012 by Matthew Fonte et al. for POROUS, SHAPE MEMORY MATERIAL, ORTHOPEDIC IMPLANT COATING;

(2) a continuation-in-part of prior U.S. patent application Ser. No. 13/936,866, filed Jul. 8, 2013 by Matthew Fonte et al. for INSOLE AND FOOT ORTHOTICS MADE OF SHAPE MEMORY MATERIAL (SMM) THREE-DIMENSIONAL SPACER FABRICS, which patent application (a) is a continuation-in-part of the aforementioned U.S. patent application Ser. No. 13/843,656 and claims benefit of the aforementioned prior U.S. patent application Ser. Nos. 13/764,188, 61/596,900, 61/612,496, 61/661,086, and 61/738,574, and (b) claims benefit of prior U.S. Provisional Patent Application Ser. No. 61/668,732, filed Jul. 6, 2012 by Matthew Fonte et al. for SHOE INSOLE AND FOOT ORTHOTICS MADE OF SHAPE MEMORY MATERIAL THREE-DIMENSIONAL SPACER FABRICS, and (c) claims benefit of prior U.S. Provisional Patent Application Ser. No. 61/671,129, filed Jul. 13, 2012 by Matthew Fonte et al. for SUPERELASTIC THREE-DIMENSIONAL SPACER FABRIC USING SHAPE MEMORY MATERIALS; and (3) claims benefit of the aforementioned prior U.S. Patent Application Ser. No. 61/671,129;

(ii) claims benefit of prior U.S. Provisional Patent Application Ser. No. 61/752,008, filed Jan. 14, 2013 by Matthew Fonte et al. for NITINOL SPACER FABRIC TECHNOLOGY FOR BODY ARMOR BACKING MATERIALS TO REDUCE BEHIND ARMOR BLUNT TRAUMA (BABT);

(iii) claims benefit of prior U.S. Provisional Patent Application Ser. No. 61/756,675, filed Jan. 25, 2013 by Matthew Fonte et al. for NITINOL SPACER FABRIC TECHNOLOGY FOR BODY ARMOR BACKING MATERIALS TO REDUCE BEHIND ARMOR BLUNT TRAUMA (BABT);

(iv) claims benefit of prior U.S. Provisional Patent Application Ser. No. 61/823,285, filed May 14, 2013 by Matthew Fonte et al. for NITINOL SPACER FABRIC TECHNOLOGY FOR BODY ARMOR; and (v) claims benefit of prior U.S. Provisional Patent Application Ser. No. 61/903,803, filed Nov. 13, 2013 by Matthew Fonte et al. for SUPERELASTIC SPACER FABRIC AND SUPERELASTIC 3D WEAVES, TECHNOLOGY FOR BODY ARMOR BACKING MATERIALS TO REDUCE BEHIND ARMOR BLUNT TRAUMA (BABT) AND SUPERELASTIC CONSTRUCTS TO REDUCE PROJECTILES VELOCITY AND IMPROVE KNIFE PROTECTION.

The fourteen (14) above-identified patent applications are hereby incorporated herein by reference.

FIELD OF THE INVENTION

This invention relates to body armor in general, and more particularly to the use of superelastic fabrics, superelastic 3D knits and weaves and/or other superelastic 3D constructs so as to reduce Behind Armor Blunt Trauma (BABT).

BACKGROUND OF THE INVENTION

The efficacy of body armor (and ballistic vests in particular) is determined by the ability of the body armor to (i) prevent projectile penetration, and (ii) absorb and dissipate the energy that is transferred through the body armor to the backface of the body armor upon projectile impact. For the purposes of the present invention, the term "projectile" can be considered to include explosive-propelled objects (e.g., bullets, shrapnel, building debris, equipment debris, etc.), and human-propelled objects (e.g., knives, bayonets, arrows, etc.). While contemporary body armor is relatively effective at preventing projectile penetration, substantial improvements are needed to appropriately address energy absorption and dissipation so as to reduce Behind Armor Blunt Trauma (BABT).

More particularly, Behind Armor Blunt Trauma (BABT) is the non-penetrating injury that results from the rapid deformation of body armor upon projectile impact to the front face of the body armor. This deformation is part of the retardation and energy-absorbing process that captures the projectile. BABT injuries often have characteristics similar to those found in blunt chest trauma that result from traffic accidents, as well as other forms of civilian blunt impact injury. BABT injuries also exhibit the characteristics of a primary blast injury. BABT injuries are frequently substantial in nature and, in extreme circumstances, can result in death.

BABT is a growing issue. An escalation in the available energy of projectiles, combined with the desire of the wearer (and therefore, body armor manufacturer) to minimize the weight and bulk of body armor, increases the risk of BABT. As seen in FIG. 1, contemporary body armor typically comprises a projectile-resistant outer layer (e.g., a hard plate or plates) and an energy-absorbing inner layer (e.g., a backing material). More particularly, the projectile-resistant outer layer may comprise one or more hard plates (e.g., ceramic or steel) which may be covered or separated by one or more thin layers of tough polymer (e.g., Kevlar). The energy-absorbing inner layer may comprise backing formed from either Ultra High Molecular Weight Polyethylene (UHMWPE) or a series of Aramid Fibers. The energy-absorbing inner layer essentially acts as padding behind the hard ceramic or steel plate(s) of the projectile-resistant outer layer so as to reduce BABT. Unfortunately, given contemporary body armor materials, effective protection from BABT necessitates greater body armor weight. As a result, body armor is either very heavy (and relatively protective) or lighter weight (and less protective).

Thus, there exists a need for a new and improved body armor which utilizes a construction which can successfully address the issue of BABT while minimizing body armor weight.

SUMMARY OF THE INVENTION

The present invention provides a new and improved body armor which utilizes a construction which can successfully address the issue of BABT while minimizing body armor weight.

More particularly, the present invention comprises the use of a novel Nitinol spacer fabric in the body armor which combines the superelastic and shape memory material attributes of Nitinol with the construct benefits of a three-dimensional spacer fabric. The Nitinol spacer fabric is produced by knitting Nitinol wire into a three-dimensional spacer fabric, resulting in a novel material that exhibits excellent energy dissipation, shape recovery (superelasticity), light weight, flexibility, durability, breathability and degradation resistance to water, perspiration and ultra-violet radiation (e.g., sunlight), and which is not susceptible to the creep characteristics often associated with polymers. These attributes make Nitinol spacer fabric an ideal backing material for body armor to reduce Behind Armor Blunt Trauma (BABT).

Superelastic (e.g., Nitinol) 3D knits and/or weaves can also mitigate projectile energy, and hence are also useful as backing materials for body armor to prevent Behind Armor Blunt Trauma (BABT). The amount of energy absorbed by fibers in knits and/or weaves is largely dependent upon their strain to failure. A woven fiber mat is effective at absorbing the impact load by dispersing the energy across a network of fibers. A fiber mat with high strength and high elongation to failure is thus expected to absorb energy via plastic deformation and drawing (stretching) of the fibers. Additionally, the strain in a fiber is equated to the impact velocity divided by the sonic velocity of the fiber. The sonic velocity, in turn, is related to the fiber's elastic modulus. A higher elastic modulus results in the impact energy wave traveling farther down the length of the fiber due to a greater sonic velocity, and thus a greater volume of fiber absorbs the projectile energy.

Other superelastic 3D constructs can also mitigate projectile energy, and hence are also useful as backing materials for body armor to reduce Behind Armor Blunt Trauma (BABT).

Thus, superelastic spacer fabric, and superelastic 3D knits and/or weaves, and/or other superelastic 3D constructs can be used so as to improve body armor protection, reduce Behind Armor Blunt Trauma (BABT).

In one preferred form of the invention, there is provided body armor comprising a projectile-resistant outer layer and an energy-absorbing inner layer, wherein the energy-absorbing inner layer comprises a superelastic three dimensional construct.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 15-18 are schematic views showing various types of weaves;

DETAILED DESCRIPTION OF THE PREFERRED EMBODIMENTS

Figure 1:
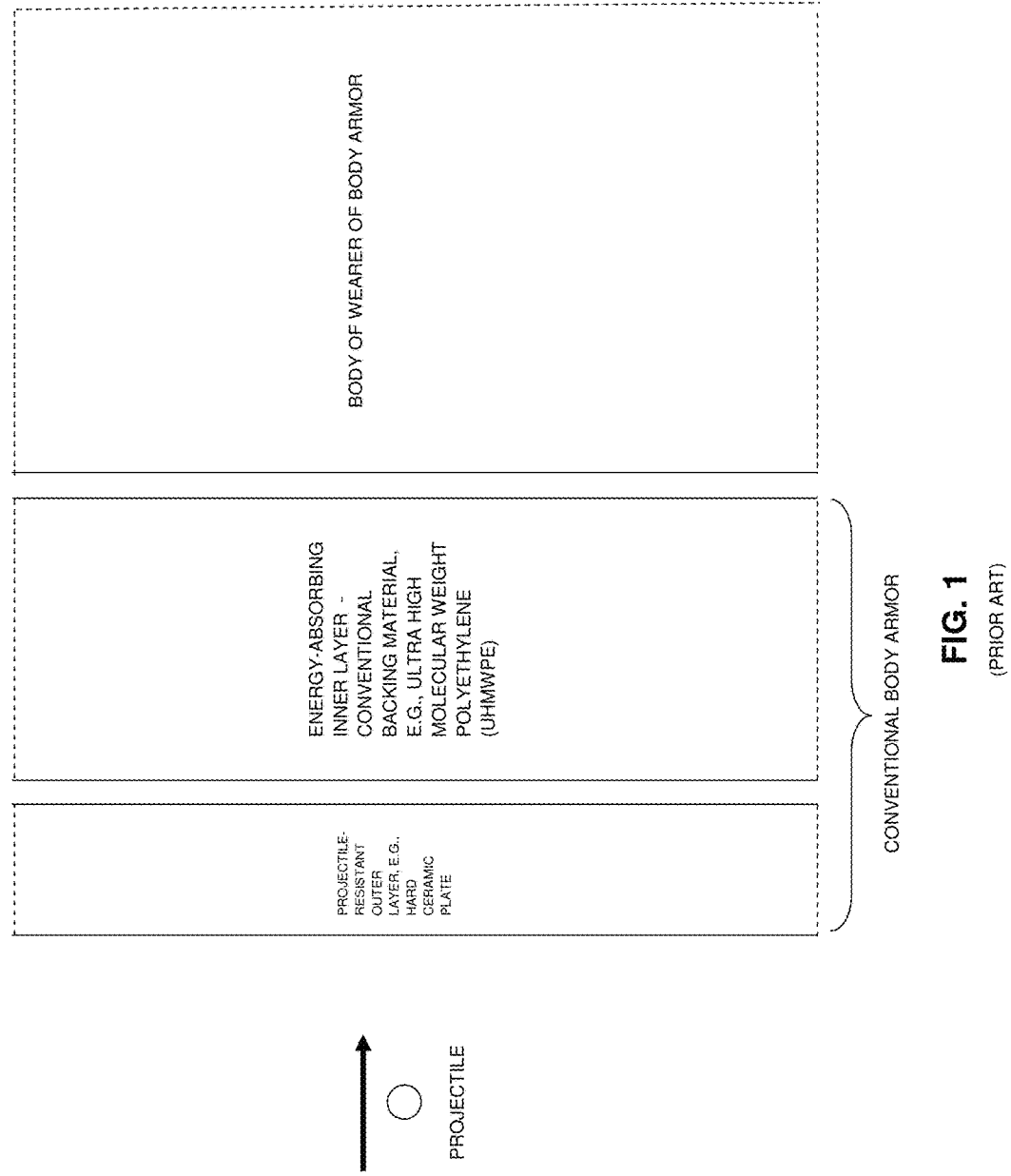
FIG. 1 is a schematic view of conventional body armor utilizing a conventional backing material.
Figure 2:
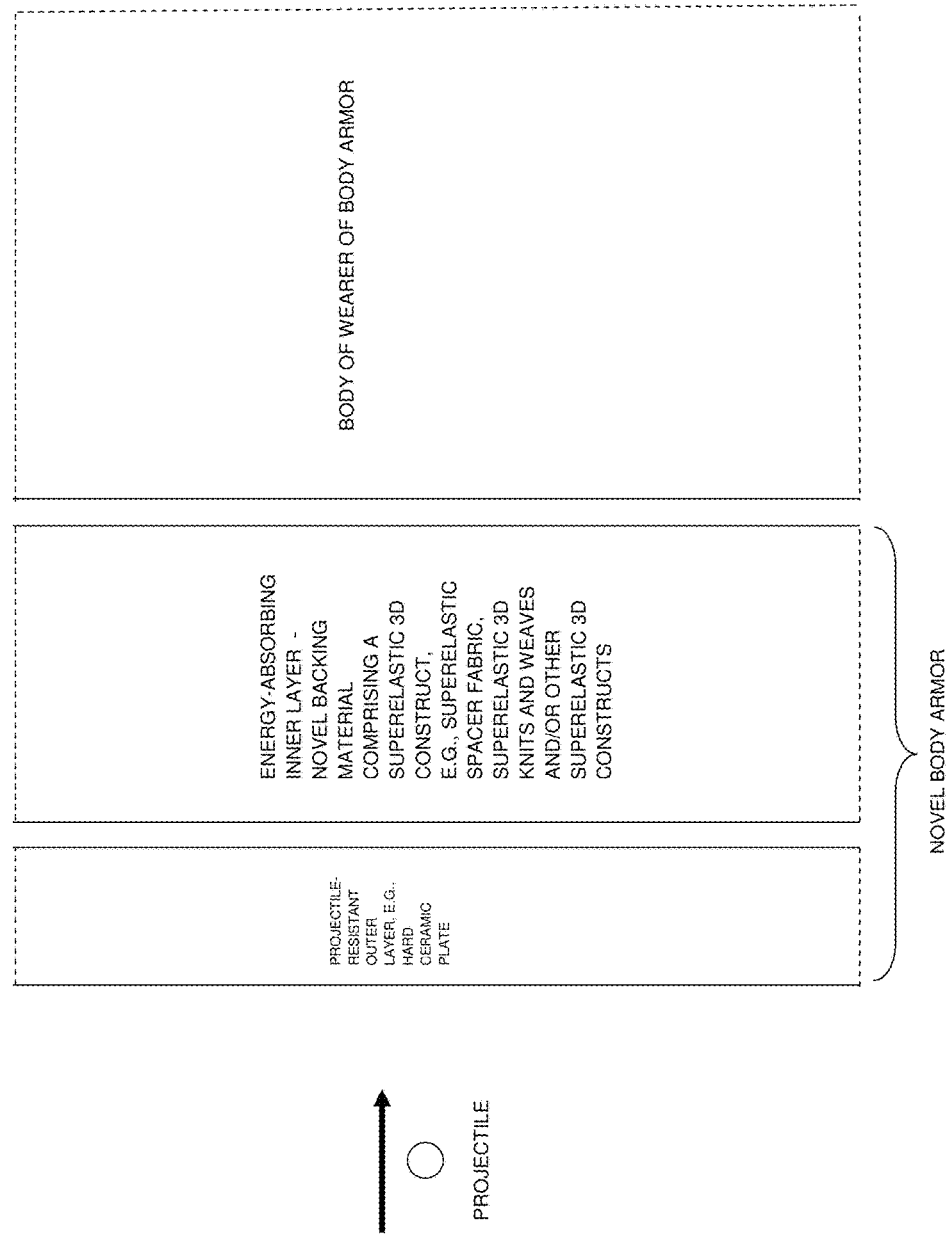
FIG. 2 is a schematic view of novel body armor utilizing a novel backing material.

The present invention comprises the provision and use of novel body armor utilizing superelastic spacer fabric, superelastic 3D knits and weaves and/or other superelastic 3D constructs so as to reduce Behind Armor Blunt Trauma (BABT). See FIG. 2.

Body Armor Utilizing Superelastic Spacer Fabrics

Figure 3:
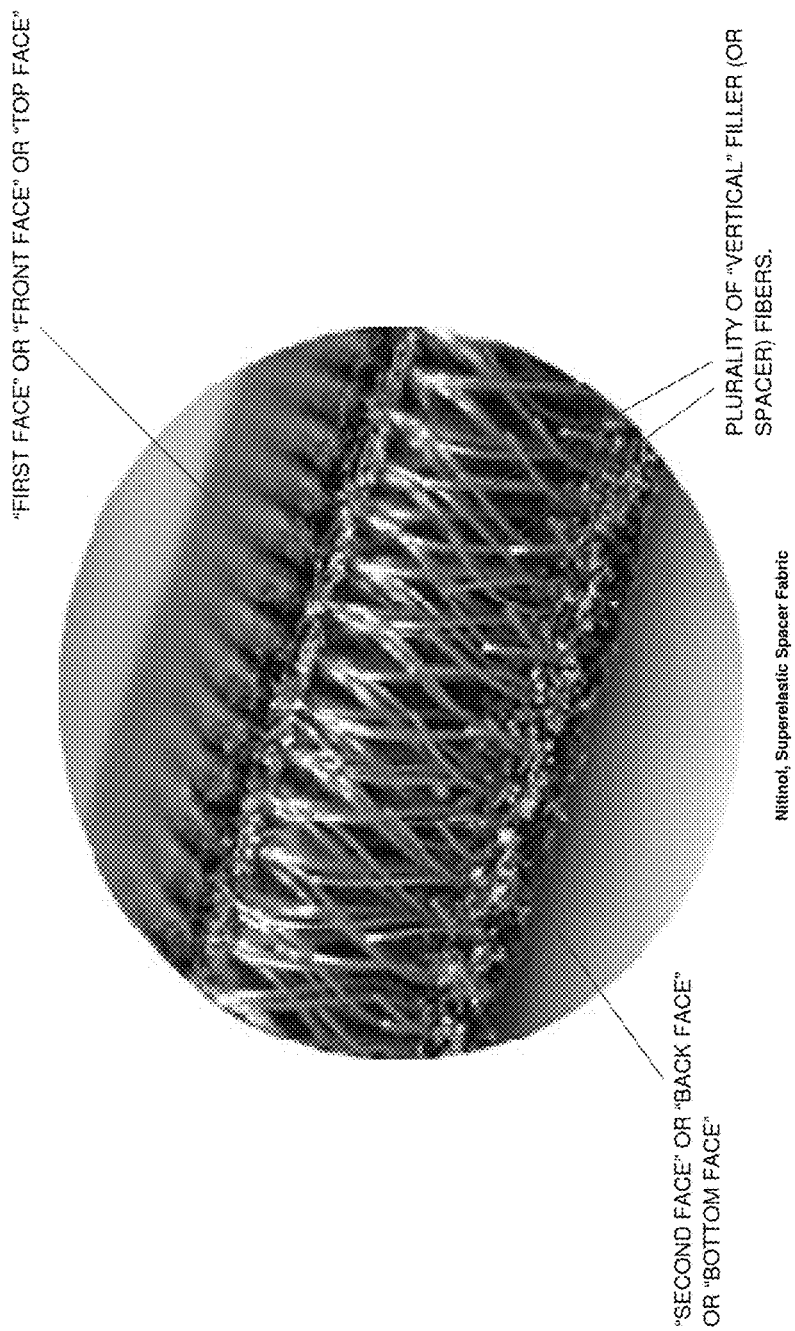
FIG. 3 is a schematic view showing superelastic spacer fabric.

In accordance with the present invention, there is provided a new and improved body armor which utilizes a three-dimensional (3D) spacer fabric construct made of shape memory material such as Nitinol as a backing material for the body armor to reduce Behind Armor Blunt Trauma (BABT). The body armor does not comprise foam. More particularly, spacer fabrics are breathable, lightweight, permeable, porous and crush-resistant constructs which are manufactured through a traditional warp knitting process so as to create a structure having two separate and unique fabric faces (i.e., a "first face" or a "front face" or a "top face", and a "second face" or a "back face" or a "bottom face") which are connected to one another by a plurality of "vertical" filler (or spacer) fibers. See FIG. 3. In accordance with the present invention, the spacer fabric is formed out of a superelastic material such as Nitinol. The superelastic vertical fibers create the elastic response in the superelastic spacer fabric when the first face (or front face or top face) and the second face (or back face or bottom face) are compressed together, by bending, collapsing and then shape recovering. Thus, the use of a superelastic spacer fabric as a backing material for body armor provides excellent force dissipation when the body armor is impacted by a projectile, whereby to reduce Behind Armor Blunt Trauma (BABT). Voids are defined between the plurality of superelastic fibers. The voids are empty spaces. That is, there is no material in the voids. As shown in FIG. 3, the plurality of superelastic fibers can define the first face and the second face of the energy-absorbing inner layer. At least one of the first face and the second face of the energy-absorbing inner layer can be superelastic. Both the first face and the second face of the energy-absorbing inner layer can be superelastic. The plurality of superelastic fibers can contact both the first face and the second face. Additionally, the first face and the second face of the energy-absorbing inner layer can be outer surfaces of the energy-absorbing inner layer. The first face can be an outermost layer of the energy-absorbing inner layer, and the second face can be an innermost layer of the energy-absorbing inner layer. The superelastic fibers, the first face, and the second face can all be made of Nitinol.

With shape-memory metals, pseudoelasticity, sometimes called superelasticity, is an elastic (reversible) response to an applied stress, caused by a phase transformation between the austenitic and martensitic phases of a crystal. Pseudoelasticity is from the reversible motion of domain boundaries during the phase transformation, rather than just bond stretching or the introduction of defects in the crystal lattice (thus it is not true superelasticity but rather pseudoelasticity). Even if the domain boundaries do become pinned, they may be reversed through heating. Thus, a pseudoelastic material may return to its previous shape (hence, shape memory) after the removal of even relatively high applied strains. One special case of pseudoelasticity is called the Bain Correspondence which involves the austenite to martensite phase transformation between a face-centered crystal lattice and a body-centered tetragonal crystal structure.

Superelastic alloys belong to the larger family of shape memory alloys. When mechanically loaded, a superelastic alloy deforms, reversibly, up to very high strains—up to 10%—by the creation of a stress-induced phase. When the load is removed, the new phase becomes unstable and the material regains its original shape. Unlike shape memory alloys that utilize the temperature-based shape memory effect, in superelasticity no change in temperature is needed for the alloy to recover its initial shape. Superelastic devices typically take advantage of the large, reversible deformation of superelastic materials. Some exemplary superelastic products which use superelastic alloys are antennas, eyeglass frames and biomedical stents.

Among other things, the present invention provides a dynamic construct for cushioning and dissipating energy from a projectile. The dynamic construct comprises a metallic shape memory material having vastly improved fatigue life versus that of polymeric alternatives. Metal and polymeric fatigue is the progressive and localized structural damage which occurs when a material is subjected to cyclic loadings. Metals and polymers differ, however, in that polymers are commonly viscoelastic and show hysteretic elastic effects. This is not true for most metals, because they tend to only exhibit linear elastic behavior. However, the relationship between stress or strain amplitude and fatigue life are asserted for polymers in the same way as for metals. Most polymeric materials exhibit significantly less endurance fatigue levels when compared to structural metals (e.g., steel, stainless steel, titanium, Nitinol, etc.).

It is the polymer's hysteretic elastic effects that make a spacer fabric structure so resilient to compressive set, however, polymers are weak compared to metal. With most engineering materials, load increases with deflection upon loading in a linear way and decreases along the same load-deflection path upon unloading. Shape memory metals (e.g., Nitinol) exhibit a distinctly different behavior—a shape memory metal exhibits a hysteretic elastic behavior similar to weak polymers, but with the large strength of metals. For example, polymers such as polyester and nylon have approximately 8-10 ksi tensile strength, while a shape memory metal such as Nitinol can have 120-200 ksi tensile strength.

Figure 4:
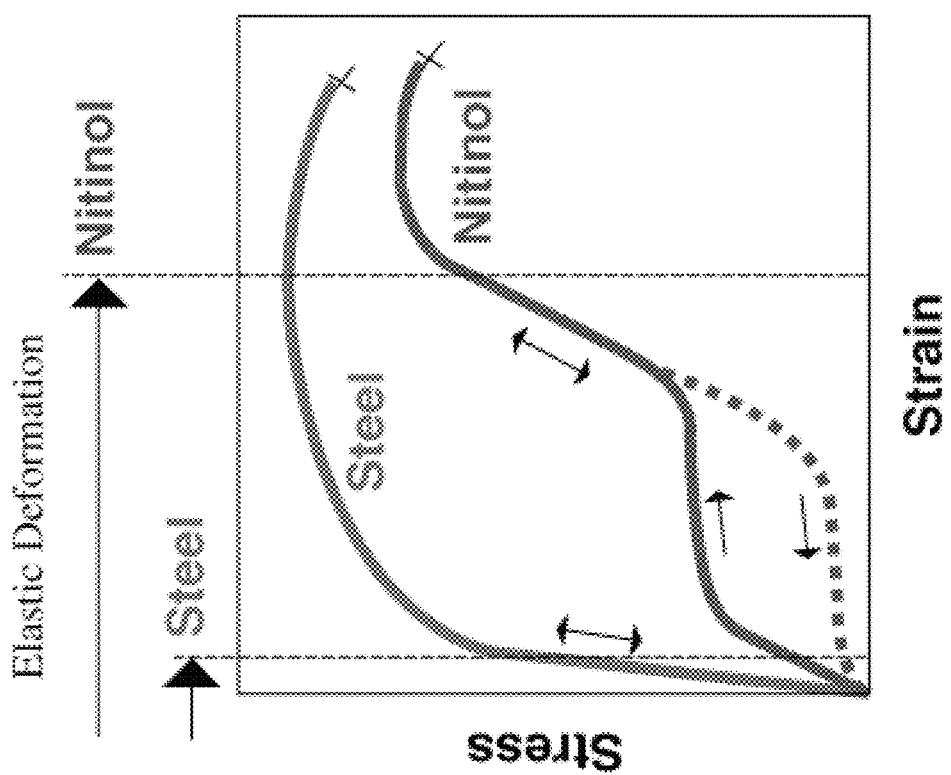
FIG. 4 is a schematic view showing the stress-strain curve of Nitinol and steel.

With Nitinol, and looking now at FIG. 4, upon loading, stress first increases linearly with strain up to approximately 1% strain. After a first "yield point", several percent strain can be accumulated with only a small stress increase. The end of this plateau ("loading plateau") is reached at about 8% strain. After that, there is another linear increase of stress with strain. Unloading from the end of the plateau region causes the stress to decrease rapidly until a lower plateau ("unloading plateau") is reached. Strain is recovered in this region with only a small decrease of stress.

Nitinol exhibits a hysteresis stress stain curve allowing for 8% shape recovery before permanent set, which is unique for metals but common for polymers. The last portion of the deforming strain is finally recovered in a linear fashion again. The unloading stress can be as low as 25% of the loading stress. For comparison, the straight line representing the linear elastic behavior (according to Hook's law) for steel is shown in FIG. 4. Nitinol has a hysteresis stress strain curve similar to that of polymers. However, when the spacer fabric is made of strong Nitinol, the spacer fabric can support heavy loads, eventually deflect under these loads, and cushion the loads so as to recover its original shape when the loads are removed.

In one preferred form of the invention, the Nitinol spacer fabric has enhanced cushion energy (CE), cushion factor (CF) and resistance to dynamic compression compared to polymer spacer fabrics when tested per the cushion testing protocol of SATRA (June, 1992, pages 1-7). Cushion energy is the energy that is required to gradually compress a specimen of a material up to a standard pressure using a tensile-compression testing machine. Cushion factor is a bulk material property, and is assessed using a test specimen greater than sixteen millimeters thick. The pressure on the surface of the test specimen at a predefined loading is multiplied by the volume of the test specimen under no load. This pressure is then divided by the cushion energy of the specimen at the predefined load. Lastly, the resistance to dynamic compression measures changes in dimensions and in cushion energy after a prolonged period of dynamic compression.

And in one particularly preferred form of the invention, the spacer fabric comprises a shape memory material (e.g., Nitinol) that is kink resistant. Unlike wires made from most metals, Nitinol wires exhibit the unique quality of being kink resistant. Nitinol wires can be bent 10 times more than stainless steel wire without suffering permanent deformation. For example, a 0.035 inch Nitinol wire can be wrapped around a 0.50 inch diameter mandrel without taking a set (i.e., without permanently deforming), whereas a stainless steel wire of the same diameter can only be bent around a 5 inch diameter mandrel without being plastically deformed. Kink resistance is an important feature of Nitinol for spacer fabrics when being produced on the double bar knitting machines to produce spacer fabrics. Most metals would not allow for the tight radii bending encountered during knitting without kinking, but Nitinol does. In use, Nitinol spacer fabric structures can be completely compressed (crushed) flat and will return to their original height when the deforming force is removed, without kinking. Other structural metal such as steel, stainless steel and titanium will kink if used for the same applications as Nitinol.

In another preferred form of the invention, the Nitinol spacer fabric has enhanced dampening and cushioning characteristics when compared to other metals (and even when compared to polymers) which are attained by exploiting the shape memory material's unique ability to recover large strains due to a solid-solid phase transformation, and to dissipate energy because of the resulting internal friction. It is known that the high damping capacity of the thermoelastic martensitic phase of Nitinol is related to the hysteretic movement of interfaces in the alloy (martensite variant interfaces and twin boundaries). Also, the damping capacity of Nitinol depends directly on external variables such as heating rate, frequency and oscillation amplitude; and internal variables such as the type of material, grain size, martensite interface density and structural defects. With Nitinol, a high damping capacity and a low storage modulus in the martensitic state is observed. It has been verified that during phase transformation, there is the presence of a peak in damping capacity and an equivalent increase of storage modulus. The storage modulus is represented by the elastic component and is related to a material's stiffness.

Figure 5:
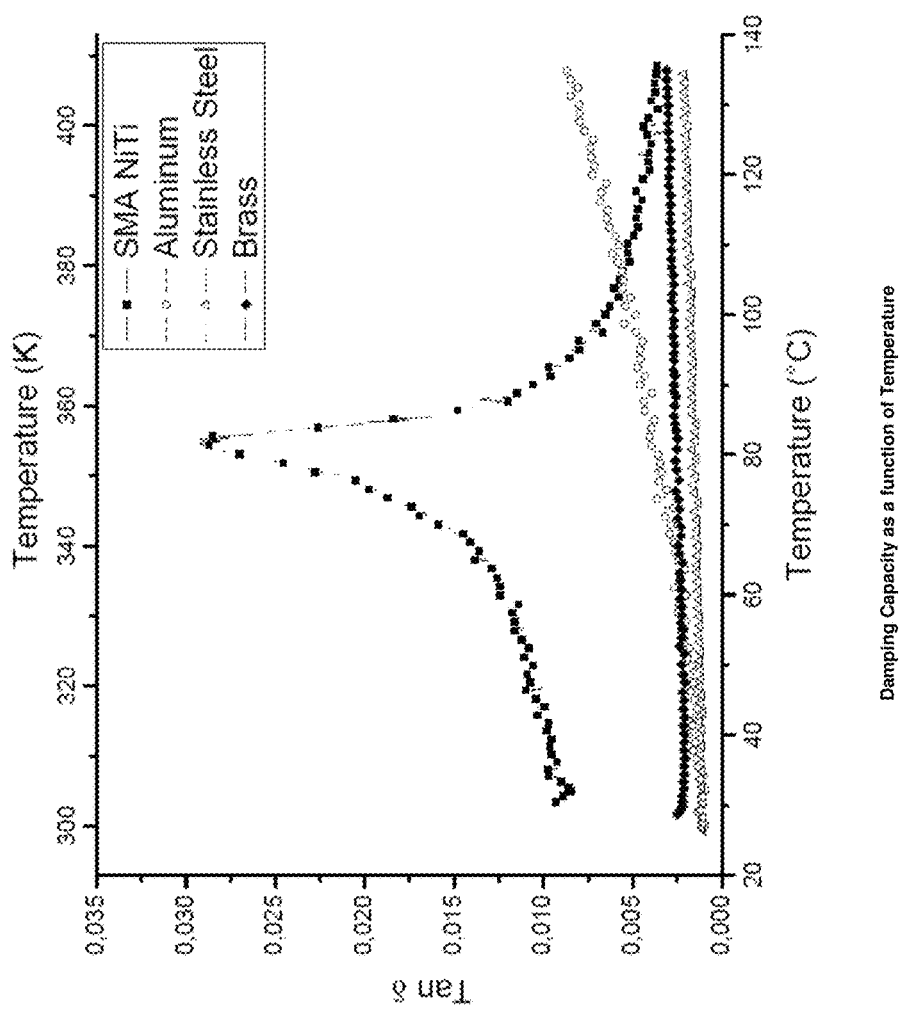
FIG. 5 is a schematic view showing damping capacity as a function of temperature for selected materials.
Figure 6:
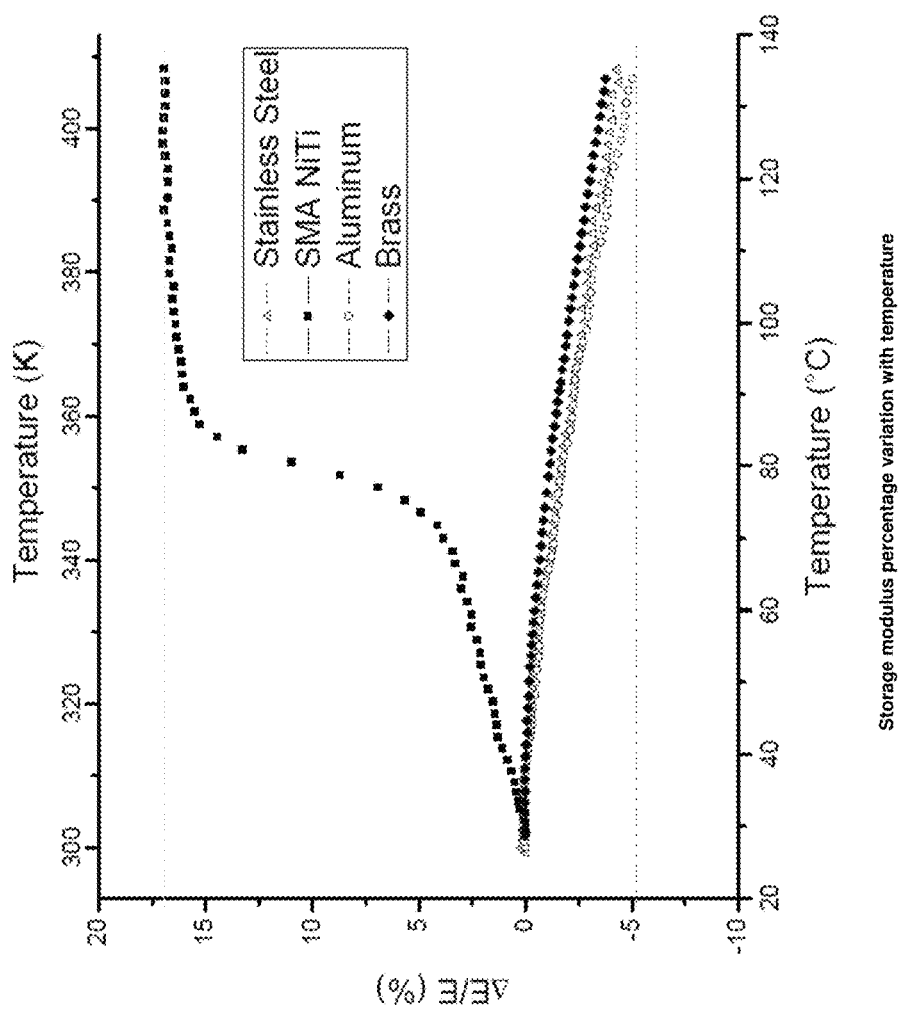
FIG. 6 is a schematic view showing storage modulus variation with temperature for selected materials.

Nitinol exhibits excellent damping capacity and energy dissipation characteristics relative to other metals including stainless steel, aluminum and brass. Nitinol damping capacity and low storage modulus is observed when the Nitinol is in its martensitic state. During phase transformation, it is verified by the presence of a peak in damping capacity and an equivalent increase of storage modulus. Dynamic properties of viscoelastic materials have been investigated using commercial Dynamic Mechanical Analyzers (DMA). This technique permits the study of the behavior of materials under dynamic loadings relating molecular structure, processing conditions and geometrical properties with material behavior. By applying a sinusoidal load, a sinusoidal response from a material will be measured. The damping capacity is represented by the tangent of the phase angle (Tan δ) between the two signals. The storage modulus, represented by the elastic component and related to material's stiffness, can be also measured. See FIG. 5, which shows damping capacity as a function of temperature for a variety of materials (including Nitinol), and FIG. 6, which shows storage modulus percentage variation with temperature for the same materials.

Figure 7:
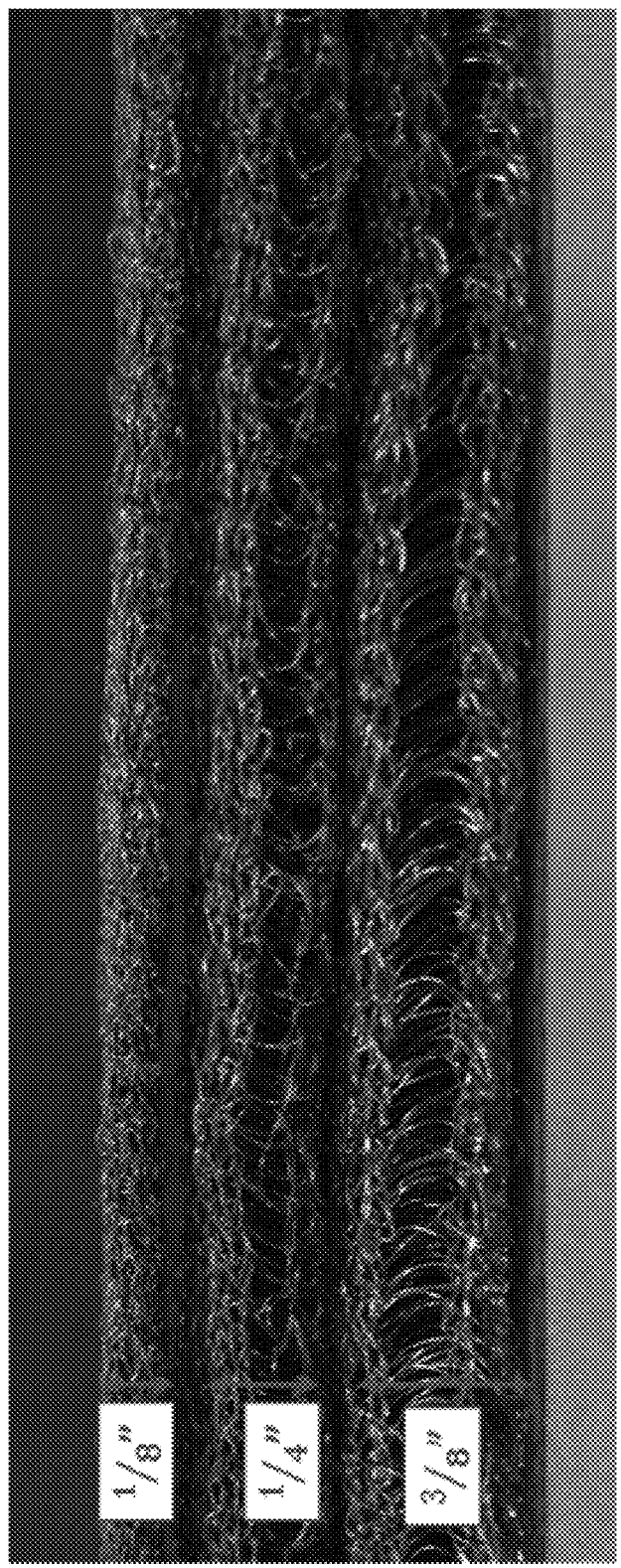
FIG. 7 is a schematic view showing superelastic spacer fabric knit into various thicknesses.

Using traditional double bar warp knitting machines, the Nitinol spacer fabric can be manufactured in large sheets (e.g., up to 72" wide, with continuous length) that can be die-, laser- or water-cut into very specific sizes. The Nitinol spacer fabric can also be knit into various thicknesses so as to offer various combinations of stiffness and weight. See FIG. 7, which shows the Nitinol spacer fabric knit into constructs of various thicknesses.

Figure 8:
FIG. 8 is a schematic view showing superelastic spacer fabric knit to an exemplary height.
Figure 9:
FIG. 9 is a schematic view showing various filler patterns for superelastic spacer fabric.
Figure 10:
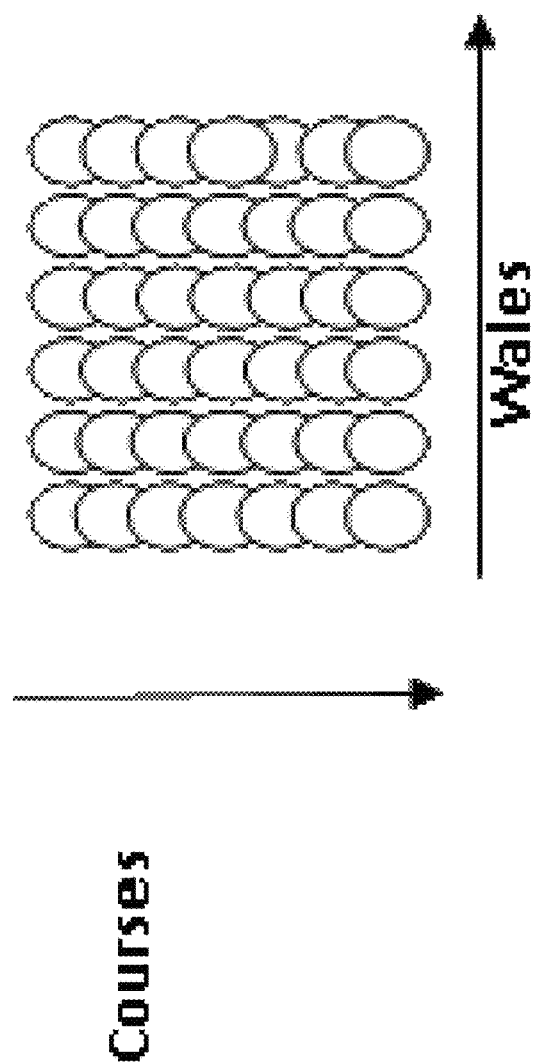
FIGS. 10-12 are schematic views showing various stich densities for superelastic spacer fabric.
Figure 12:
Figure 11:
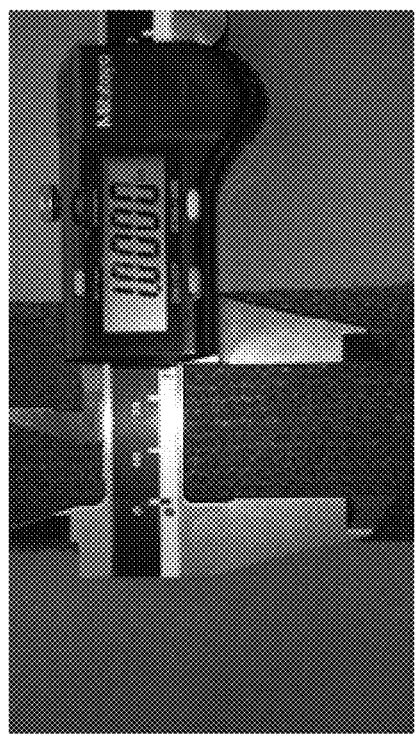
Figure 13:
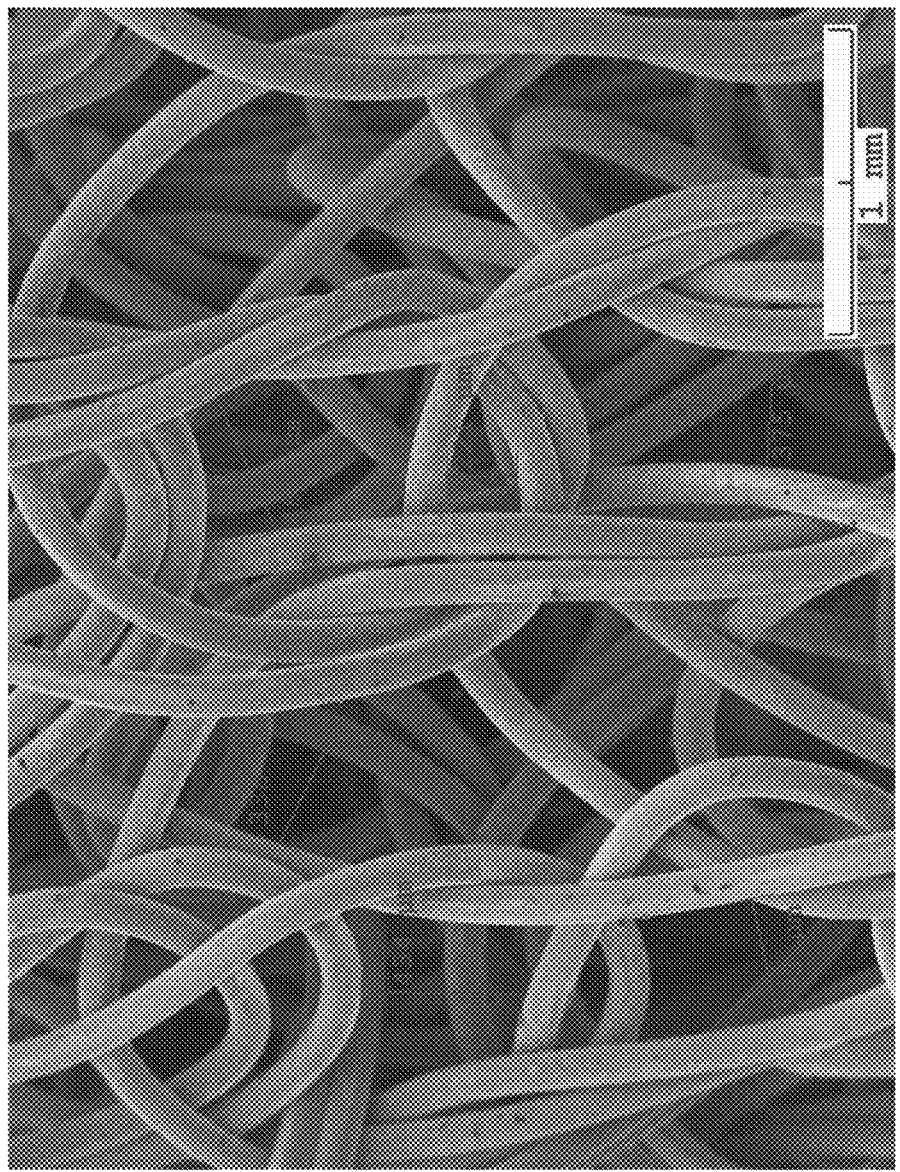
FIG. 13 is a schematic view showing an exemplary filler density for superelastic spacer fabric.

The Nitinol spacer fabric may be manufactured with a wide range of physical properties. Significant Nitinol spacer fabric variables include:

(i) Nitinol Wire Thickness—examples include wire at 0.0005" to 0.015" diameter thickness;

(ii) Height of Nitinol spacer fabric (per ply)—examples include height ranging from 0.025" to 0.750" (see FIG. 8);

(iii) Filler Pattern—the Filler Pattern can be in various shapes, e.g., the shape of an X or a Trestle or a C. One preferred Nitinol spacer fabric has an "X" filler pattern (when looking in the end of the spacer fabric) as shown in FIG. 9. Another preferred Nitinol spacer fabric has a "trestle" filler pattern as shown in FIG. 9;

(iv) Face Stitch Density—examples are 5-25 stiches per inch (East to West; referred to as "Wales") and 5-25 stitches per inch (North to South; referred to as "Courses"). See FIGS. 10-12;

(v) Filler Density—by way of example, the filler density may utilize approximately 5-25 stitches per inch, FIG. 13 shows 10 stiches per inch;

(vi) Direction of Plies (layers)—for body armor backing material, there are preferably multiple (e.g., up to 10) plies of Nitinol spacer fabric; the direction of these plies (i.e., stacked in one uniform direction or, alternatively, stacked in a criss-crossed pattern, e.g., at 15°, 30°, 45° or even 90° from one layer to the next) can have an effect on the strength, stiffness and energy absorption of the Nitinol spacer fabric.

Experimental testing has shown that Nitinol spacer fabric performs extremely well as backing material for body armor. Specifically, Nitinol spacer fabric is significantly lighter, more energy dissipating and has faster recovery characteristics than currently-used Ultra High Weight Molecular Polyethylene (UHWMP) backing material.

Nitinol spacer fabric can be used as a standalone construct behind the ceramic plates in body armor or it can be used in conjunction with other materials, e.g., Kevlar, UHWMP, gels, etc.

It is also possible to create the superelastic spacer fabric of the present invention utilizing a superelastic material other than Nitinol. Thus, for example, the superelastic spacer fabric may be created using a superelastic polymer.

Body Armor Utilizing 3D Superelastic Woven Structures and/or Other Superelastic 3D Constructs The present invention also comprises the provision and use of novel body armor utilizing superelastic 3D weaves and/or other superelastic 3D constructs so as to reduce Behind Armor Blunt Trauma (BABT). The body armor can include a projectile-resistant outer layer and an energy-absorbing inner layer. The energy-absorbing inner layer can include a superelastic three dimensional construct including a plurality of superelastic fibers of Nitinol, an innermost surface of Nitinol, an outermost surface of Nitinol, and voids. The voids are defined between the plurality of superelastic fibers. The voids are empty spaces. That is, there is no material in the voids.

Figures 14A, 14B:
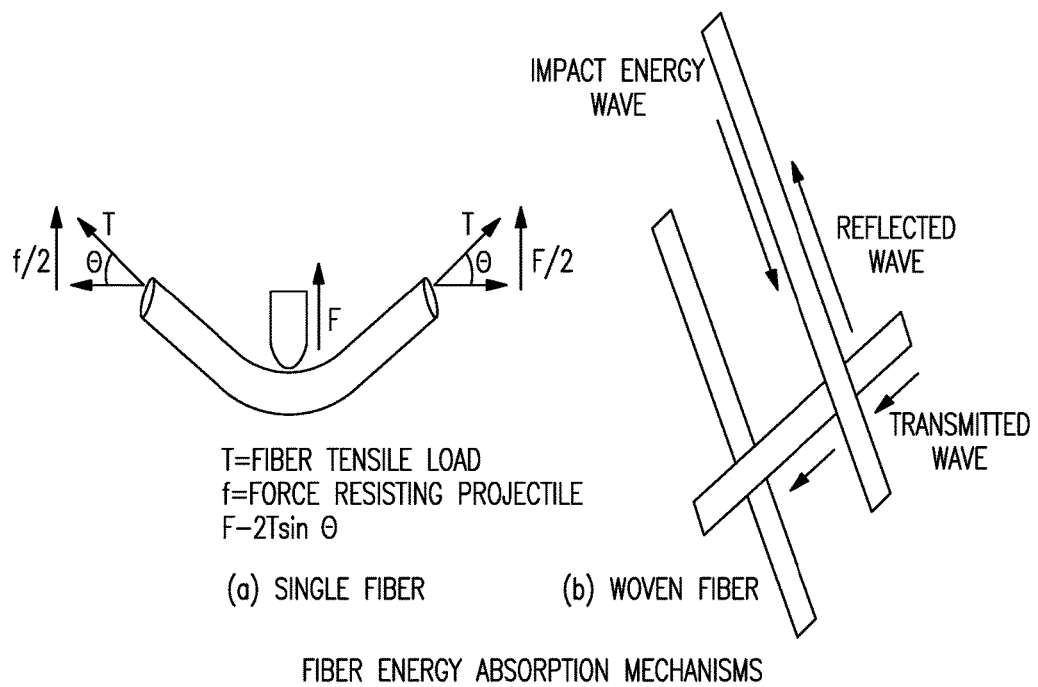
FIGS. 14A and 14B are schematic views showing various energy absorption mechanisms for fibers.

Woven fiber mats mitigate projectile energy in different ways. The amount of energy absorbed by fibers is largely dependent upon their strain to failure, as depicted in FIG. 14A. A woven fiber mat is effective at absorbing the impact load by dispersing the energy across a network of fibers, as depicted in FIG. 14B.

A fiber mat with high strength and high elongation to failure is thus expected to absorb energy via plastic deformation and drawing (stretching) of the fibers. Additionally, the strain in a fiber is equated to the impact velocity divided by the sonic velocity of the fiber (Eq. 1).

$$\varepsilon = \frac{V}{c} \qquad \text{Equation 1}$$

where,

ε—strain

V—impact velocity c—sonic velocity of the fiber

The sonic velocity, in turn, is related to the fiber's elastic modulus, as shown in Eq. 2. A higher elastic modulus results in the impact energy wave traveling farther down the length of the fiber due to a greater sonic velocity, and thus a greater volume of fiber absorbs the projectile energy.

$$c = \sqrt{\frac{E}{\rho}} \quad \text{Equation 2}$$

where,
E—elastic modulus
ρ—density of the fiber

In another preferred form of the invention, Nitinol (and/or other shape memory materials such as other superelastic alloys, superelastic polymers, etc.) may be woven into a three-dimensional woven structure (i.e., a 3D weave) that provides excellent impact attenuation, resistance to knife penetration, light weight, re-compression, texture (and other) characteristics required for body armor. See FIG. 15, which shows various types of 3D weaves which may be used in forming the backing material for body armor.

High performance fiber materials used in body and/or vehicle armors include S-glass, aramid, high molecular weight polyethylene, etc. Continuous fibers are characterized by "denier", which is a measure of the weight, in grams, per 9000 meters (29,530 ft.) of fiber. Thus, when comparing fibers that have the same density, a smaller denier equates to a thinner fiber.

Figure 15:
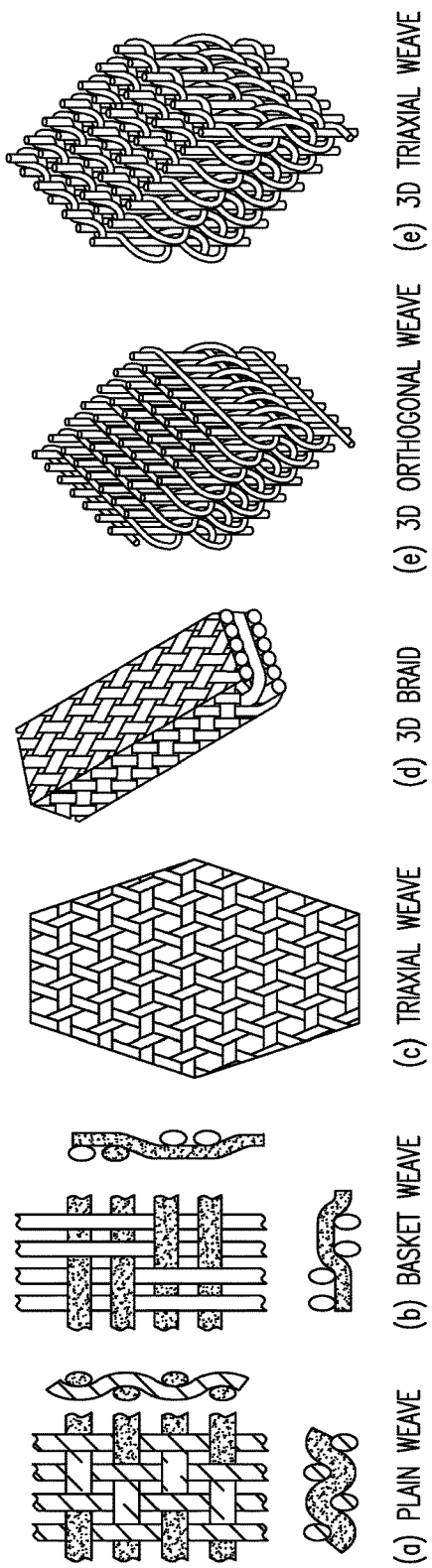

Fibers can be woven together into a number of different configurations, some of which are FIG. 15, to provide varying degrees of performance and flexibility. Fiber structures for armor applications have traditionally been in unidirectional, plain, or basket weave configurations. Unidirectional fiber layers may be rotated 90° with respect to adjacent layers to create a cross-ply fabric. Additional woven structures have been studied for armor applications, such as 3D structures to enhance the multi-hit capability of composites.

Figure 18:
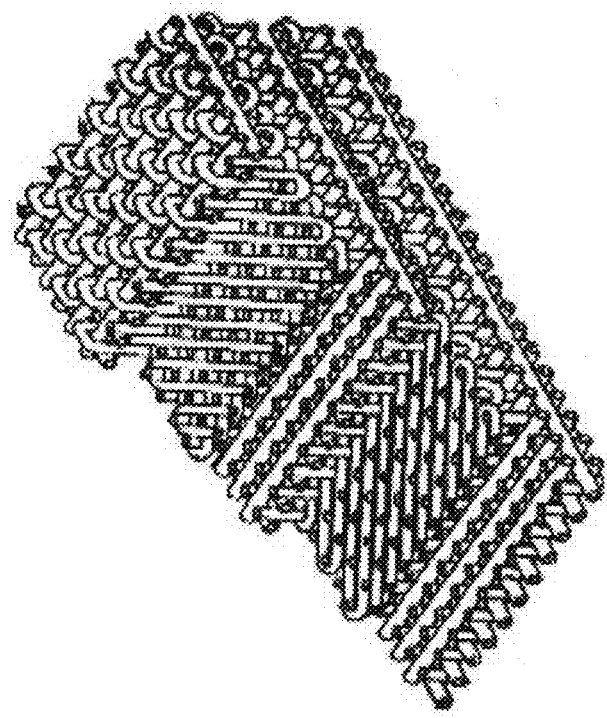
Figure 17:
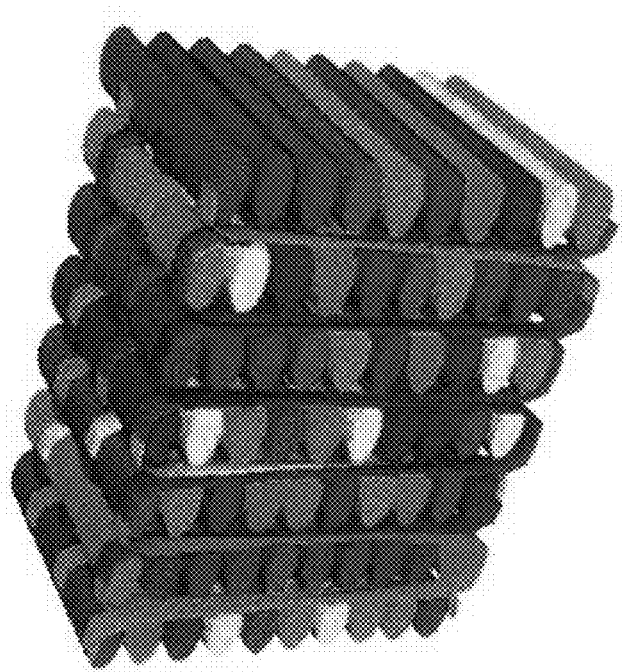

3D fabrics are related in principle to 2D fabrics, but possess a noticeable third dimension of significant depth or thickness created during the 3D weaving process. 3D woven structures are generally comprised of a Warp, Fill, and "Z" fibers. See FIGS. 16-18.

Figure 19:
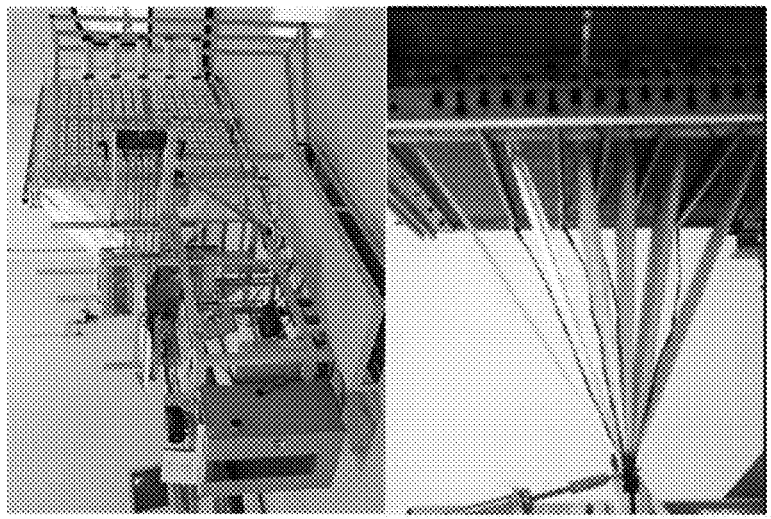
FIG. 19 is a schematic view showing a weaving machine.

3D weaves exhibit many attributes including, but not limited to, design flexibility and versatility; inherent resistance to delamination; improved damage tolerance; ability to tailor composite properties to the application; near net-shape preform capabilities; and reduced lay-up complexity and handling time. See FIG. 19.

The two major classifications or definitions of 3D woven mediums are angle interlock and orthogonal interlock binding. From these definitions four different structures can be formed:

(i) Angle interlock through the thickness (A/T);
(ii) Angle interlock layer to layer (A/L);
(iii) Orthogonal interlock through the thickness (O/T); and
(iv) Orthogonal interlock layer to layer (O/L).

Figure 20:
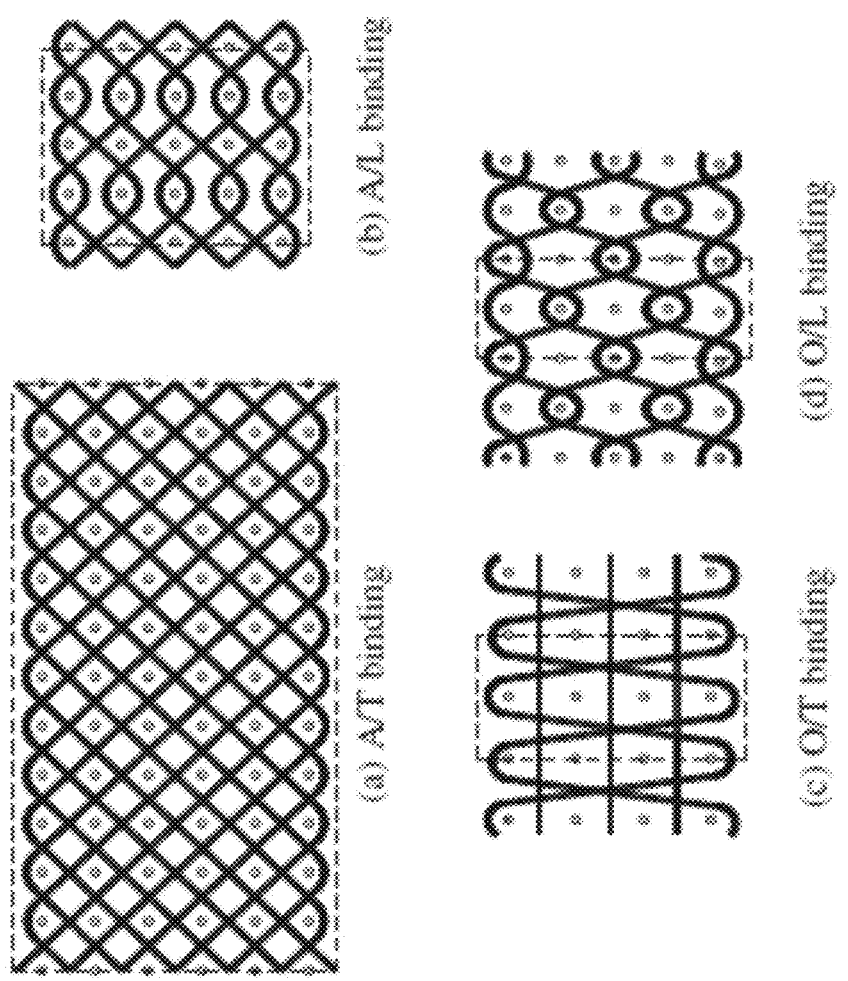
FIGS. 20-22 are schematic views showing various woven structures.

See FIG. 20.

Figure 21:
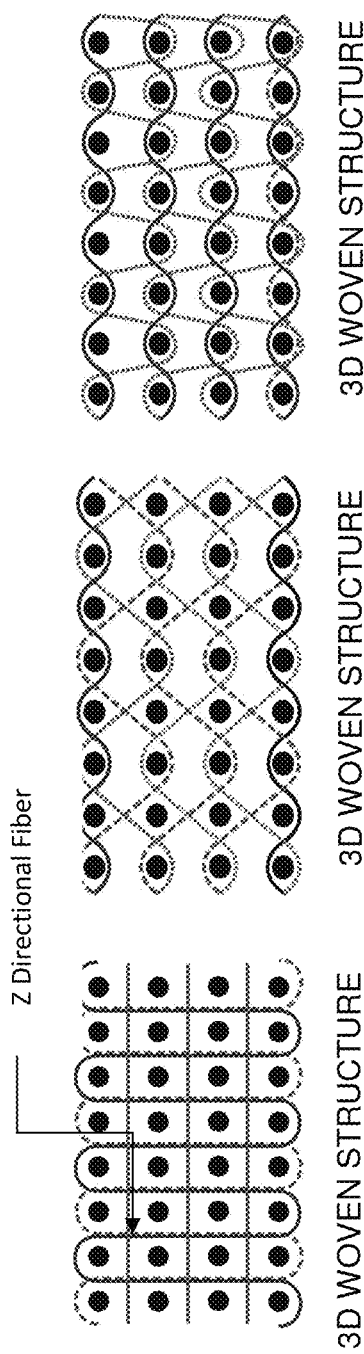

3D woven structures are highly variable and may be tailored to meet different specifications; different patterns and structures are achieved through different location/direction of the Warp, Fill, and Z fibers. A few different 3D woven structures are shown in FIG. 21.

The density of each layer may be engineered to promote a gradient stiffness through the three-dimensional construct. Various materials may be incorporated into the 3D weave to achieve different characteristics. These materials may include, but are not limited to, other shape memory materials (alloys and polymers); aramid fibers; UHWMPE; non-superelastic alloys; carbon fibers; polyester; and/or nylons.

TABLE 2

Mechanical Properties of Some Fibers, Including Projections for M5 ® [4]

| Fiber | Strength (σ) (GPa) | Failure Strain (ε) (%) | Modulus (E) (GPa) |
|---|---|---|---|
| 600-den. Kevlar KM2 | 3.40 | 3.55 | 82.6 |
| 850-den. Kevlar KM2 | 3.34 | 3.80 | 73.7 |
| 840-den. Kevlar 129 | 3.24 | 3.25 | 99.1 |
| 1,500-den. Kevlar 29 | 2.90 | 3.38 | 74.4 |
| 200-den. Kevlar 29 | 2.97 | 2.95 | 91.1 |
| 1,000-den. Kevlar 29 | 2.87 | 3.25 | 78.8 |
| 1,140-den. Kevlar 49 | 3.04 | 1.20 | 120 |
| Carbon fiber | 3.80 | 1.76 | 227 |
| E-glass | 3.50 | 4.70 | 74.0 |
| Nylon | 0.91 | N/A | 9.57 |
| M5 conservative | 8.50 | 2.50 | 300 |
| M5 goal | 9.50 | 2.50 | 450 |
| M5 (2001 sample) | 3.96 | 1.40 | 271 |

Being able to produce a 3D weave made of shape memory allows (SMAs) such as Nitinol is advantageous because of Nitinol's (NiTi) superelastic characteristics. The amount of energy absorbed by fibers is largely dependent upon their strain to failure. Nitinol has large strain to failure, at 8% strain recovery. A woven fiber made of Nitinol is effective at absorbing the impact load by dispersing the energy across a network of fibers. This woven structure can also be woven with one or more other known aramid fibers or projectile protection type fibers. Nitinol has a high strength and high elongation to failure ratio, thus it is expected to absorb energy via superelastic deformation and drawing (stretching) of the fibers. Nitinol can be woven in the cold worked condition, superelastic condition or the martensitic condition or a combination thereof.

| | | CW = (Cold Worked) | | SE = (Super-Elastic) | | | | |
|---|---|---|---|---|---|---|---|---|
| Product | Ingot $A_s$ (° C.) | UTS (psi) | Elongation (%) | UTS (psi) | Elongation (%) | Loading Plateau (psi) | Unloading Plateau (psi) | Active $A_f$ (° C.) |
| Niti#1 | −35 to −10 | 200,000 min | >4% | 180,000 min | >10% | >70,000 | >20,000 | −10 to −18 |
| Niti#2 | −45 to −15 | 250,000 min | >4% | 210,000 min | >10% | >80,000 | >35,000 | 0 to −18 |
| Niti#3 | −80 | 200,000 min | >5% | 180,000 min | >10% | >100,000 | >60,000 | −15 |
| Niti#4 | −10 to −10 | 220,000 min | >4% | 180,000 min | >10% | >65,000 | >15,000 | −14 to −22 |
| Niti#9 | ≤−35 | 220,000 min | >4% | 160,000 min | >10% | >75,000 | >25,000 | ≤0 |

Figure 22:
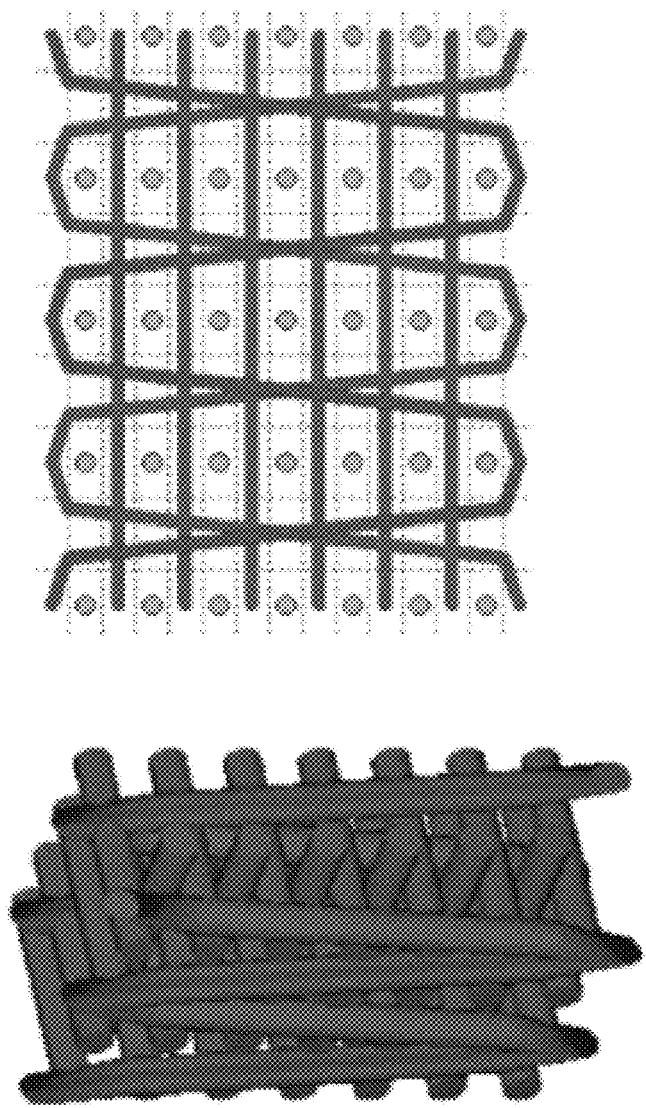

Nitinol can be three-dimensionally woven to create a complex structure that can be strong enough to withstand projectiles but elastic enough to absorb the energy to reduce the projectile's speed. See FIG. 22. Alternatively, other superelastic materials (e.g., other superelastic shape memory alloys, superelastic polymers, etc.) may be used to create superelastic 3D weaves or other superelastic 3D constructs for use as backing material in body armor.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A body armor comprising:
a projectile-resistant outer layer; and
an energy-absorbing inner layer, wherein the energy-absorbing inner layer comprises a superelastic three dimensional construct including a plurality of superelastic fibers that define a first face and a second face of the energy-absorbing inner layer, wherein at least one of the first face and the second face of the energy-absorbing inner layer are superelastic, and voids, which are defined between the plurality of superelastic fibers, wherein the voids are empty spaces, wherein the body armor does not comprise foam.

2. The body armor according to claim 1 wherein the projectile-resistant outer layer comprises ceramic plate.

3. The body armor according to claim 1 wherein the projectile-resistant outer layer comprises a para-aramid synthetic fiber.

4. The body armor according to claim 1 wherein the plurality of superelastic fibers comprise a shape memory alloy.

5. The body armor according to claim 4 wherein the shape memory alloy comprises Nitinol.

6. The body armor according to claim 1 wherein the superelastic fibers comprises a superelastic polymer.

7. The body armor according to claim 1 wherein the plurality of superelastic fibers are combined with at least one selected from the group consisting of aramid fibers, ultra high molecular weight polyethylene (UHWMPE), non-superelastic alloys, carbon fibers, polyester, and a nylon.

8. The body armor according to claim 1 wherein the plurality of superelastic fibers comprise at least one of a knit, a weave and an unordered mass.

9. The body armor according to claim 8 wherein the superelastic three dimensional construct comprises superelastic spacer fabric.

10. The body armor according to claim 8 wherein the superelastic three dimensional construct comprises a 3D weave.

11. The body armor according to claim 10 wherein the 3D weave comprises Warp, Fill, and Z-Filler fibers made of a superelastic material.

12. The body armor according to claim 11 wherein the 3D weave comprises an "angle interlock" or an "orthogonal interlock" binding, whereby to provide a plurality of structure options.

13. The body armor according to claim 12 wherein the structure options comprise angle interlock through the thickness (A/T); angle interlock layer to layer (A/L); orthogonal interlock through the thickness (O/T); and orthogonal interlock layer to layer (O/L).

14. The body armor according to claim 1, wherein the first face and the second face of the energy-absorbing inner layer are outer surfaces of the energy-absorbing inner layer.

15. The body armor according to claim 1 wherein each of the plurality of superelastic fibers is a Nitinol wire.

16. The body armor according to claim 1 wherein both the first face and the second face of the energy-absorbing inner layer are superelastic.

17. The body armor according to claim 1 wherein the first face is an outermost layer of the energy-absorbing inner layer and the second face is an innermost layer of the energy-absorbing inner layer.

18. The body armor according to claim 1 wherein the plurality of superelastic fibers, the first face, and the second face are all made of Nitinol.

19. The body armor according to claim 1 wherein the superelastic three dimensional construct has a height between 0.025 inch and 0.750 inch.

20. The body armor according to claim 15 wherein each of the Nitinol wires have a diameter between 0.0005 inch and 0.015 inch.

21. The body armor according to claim 1 wherein the superelastic three dimensional construct includes 5 to 25 stitches per inch.

22. The body armor according to claim 1 wherein, in response to an applied stress, a phase of the plurality of superelastic fibers transforms between an austenitic phase and a martensitic phase.

23. A body armor comprising:
a projectile-resistant outer layer; and
an energy-absorbing inner layer, wherein the energy-absorbing inner layer comprises a superelastic three dimensional construct including a plurality of superelastic fibers of Nitinol, an innermost surface of Nitinol, an outermost surface of Nitinol, and voids, which are defined between the plurality of superelastic fibers, wherein the voids are empty spaces, wherein the body armor does not comprise foam.

* * * * *